United States Patent
Schuh et al.

(10) Patent No.: US 10,364,804 B2
(45) Date of Patent: Jul. 30, 2019

(54) ELECTRIC FIELD ACTIVATION OF SHAPE MEMORY CERAMICS

(71) Applicant: Massachusetts Institute of Technology, Cambridge, MA (US)

(72) Inventors: Christopher A. Schuh, Wayland, MA (US); Alan Lai, Westborough, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 203 days.

(21) Appl. No.: 15/382,516

(22) Filed: Dec. 16, 2016

(65) Prior Publication Data

US 2017/0167472 A1 Jun. 15, 2017

Related U.S. Application Data

(63) Continuation of application No. 14/670,329, filed on Mar. 26, 2015, now Pat. No. 9,548,678, which is a (Continued)

(51) Int. Cl.
 *C04B 35/16* (2006.01)
 *F03G 7/06* (2006.01)
 (Continued)

(52) U.S. Cl.
 CPC .............. *F03G 7/065* (2013.01); *C04B 35/01* (2013.01); *C04B 35/057* (2013.01);
 (Continued)

(58) Field of Classification Search
 CPC ..... C04B 35/447; C04B 35/486; C04B 35/48; C04B 35/119; C04B 35/484
 (Continued)

(56) References Cited

U.S. PATENT DOCUMENTS

| 4,767,730 A | 8/1988 | Soma et al. |
| 5,047,373 A | 9/1991 | Ketcham |

(Continued)

FOREIGN PATENT DOCUMENTS

| CN | 1453242 A | 11/2002 |
| DE | 3426886 A1 | 2/1985 |

(Continued)

OTHER PUBLICATIONS

Uchino. Materials Issues in Design and Performance of Piezoelectric Actuators: An Overview. Acta mater. vol. 46, No. 11, pp. 3745-3753, 1998.*

(Continued)

*Primary Examiner* — Noah S Wiese
(74) *Attorney, Agent, or Firm* — Wolf, Greenfield & Sacks, P.C.

(57) ABSTRACT

Articles and methods in which an electric field is used to actuate a material are generally described. Provided in one embodiment is a method including applying an electric field to a ceramic material. Applying the electric field to the ceramic material can transform the ceramic material from a first solid phase to a second distinct solid phase. The applied electric field is less than a breakdown electric field of the ceramic material, according to certain embodiments.

23 Claims, 11 Drawing Sheets

Related U.S. Application Data continuation-in-part of application No. 13/791,857, filed on Mar. 8, 2013, now Pat. No. 9,018,117.

(60) Provisional application No. 61/970,772, filed on Mar. 26, 2014, provisional application No. 61/666,995, filed on Jul. 2, 2012.

(51) Int. Cl.

| | | |
|---|---|---|
| H02N 2/00 | (2006.01) | |
| C04B 35/01 | (2006.01) | |
| C04B 35/057 | (2006.01) | |
| C04B 35/111 | (2006.01) | |
| C04B 35/18 | (2006.01) | |
| C04B 35/195 | (2006.01) | |
| C04B 35/20 | (2006.01) | |
| C04B 35/22 | (2006.01) | |
| C04B 35/46 | (2006.01) | |
| C04B 35/486 | (2006.01) | |
| C04B 35/495 | (2006.01) | |
| C04B 35/50 | (2006.01) | |
| C04B 35/547 | (2006.01) | |
| C04B 35/626 | (2006.01) | |

(52) U.S. Cl.
CPC ............ *C04B 35/111* (2013.01); *C04B 35/16* (2013.01); *C04B 35/18* (2013.01); *C04B 35/195* (2013.01); *C04B 35/20* (2013.01); *C04B 35/22* (2013.01); *C04B 35/46* (2013.01); *C04B 35/486* (2013.01); *C04B 35/495* (2013.01); *C04B 35/50* (2013.01); *C04B 35/547* (2013.01); *C04B 35/6262* (2013.01); *H02N 2/0005* (2013.01); *C04B 2235/3206* (2013.01); *C04B 2235/3208* (2013.01); *C04B 2235/3224* (2013.01); *C04B 2235/3225* (2013.01); *C04B 2235/3229* (2013.01); *C04B 2235/3244* (2013.01); *C04B 2235/3287* (2013.01); *C04B 2235/76* (2013.01); *C04B 2235/78* (2013.01); *C04B 2235/785* (2013.01); *C04B 2235/786* (2013.01); *C04B 2235/788* (2013.01); *C04B 2235/94* (2013.01); *C04B 2235/96* (2013.01)

(58) Field of Classification Search
USPC .................................. 501/102, 103, 104, 105
See application file for complete search history.

(56) References Cited

U.S. PATENT DOCUMENTS

| | | | |
|---|---|---|---|
| 5,284,698 A | 2/1994 | Marshall et al. | |
| 7,642,210 B2 * | 1/2010 | Okamoto ............. | B01D 53/885 423/608 |
| 8,282,746 B2 | 10/2012 | Schuh et al. | |
| 9,018,117 B2 | 4/2015 | Schuh et al. | |
| 9,091,314 B2 | 7/2015 | Schuh et al. | |
| 9,512,039 B2 | 12/2016 | Schuh et al. | |
| 9,548,678 B2 | 1/2017 | Schuh et al. | |
| 2005/0229670 A1 | 10/2005 | Perreault | |
| 2007/0137740 A1 | 6/2007 | Johnson et al. | |
| 2009/0168198 A1 | 7/2009 | Perreault | |
| 2009/0188978 A1 | 7/2009 | Perreault | |
| 2009/0244687 A1 | 10/2009 | Perreault | |
| 2014/0005028 A1 | 1/2014 | Schuh et al. | |
| 2014/0255693 A1 | 9/2014 | Schuh et al. | |
| 2015/0354046 A1 | 12/2015 | Tuncer et al. | |

FOREIGN PATENT DOCUMENTS

| | | |
|---|---|---|
| EP | 0388747 A2 | 9/1990 |
| EP | 1621251 A1 | 2/2006 |
| EP | 2307585 A2 | 4/2011 |
| WO | WO 03/104162 A1 | 12/2003 |
| WO | WO 2010/053602 A2 | 5/2010 |
| WO | WO 2014/007852 A1 | 1/2014 |
| WO | WO 2014/138316 A1 | 9/2014 |
| WO | WO 2015/073016 A1 | 5/2015 |

OTHER PUBLICATIONS

Jin. Martensitic transformation in zirconia containing ceramics and its applications. Current Opinion in Solid State and Materials Science 9 (2005) 313-318.*
Otsuka et al. Shape Memory Materials. Cambridge University Press, 1998. pp. 185-189 and 193-195.*
International Search Report and Written Opinion dated Jun. 3, 2015 in PCT/US2015/022698.
International Search Report and Written Opinion for Application No. PCT/US2013/030049 dated Jul. 5, 2013.
International Preliminary Report on Patentability for Application No. PCT/US2013/030049 dated Jan. 15, 2015.
International Search Report and Written Opinion for Application No. PCT/US2014/020938 dated Jun. 18, 2014.
International Preliminary Report on Patentability for Application No. PCT/US2014/020938 dated Sep. 17, 2015.
Notice of Allowance for U.S. Appl. No. 14/198,561 dated Aug. 8, 2016.
Chen et al., Shape memory and superelasticity in polycrystalline Cu—Al—Ni microwires. Appl. Phys. Lett. 2009; 95(171906): 1-3.
Chen et al., Size effects in shape memory alloy microwires. Acta Materialia. Oct. 27, 2010; 59(2):537-553.
Jin, Martensitic transformation in zirconia containing ceramics and its applications. Current Opinion in Solid State and Materials Science. Dec. 2005;9(6):313-8.
Lai et al., Shape memory and superelastic ceramics at small scales. Science. Sep. 27, 2013;341(6153):1505-8. doi: 10.1126/science.1239745.
Otsuka et al., Shape Memory Materials. Cambridge Univeristy Press, 1998: 185-9 and 193-5.
San Juan et al., Nanoscale shape-memory alloys for ultrahigh mechanical damping. Nat Nanotechnol. Jul. 2009;4(7):415-9. doi:10.1038/nnano.2009.142. Epub Jun. 7, 2009.
San Juan et al., Superelasticity and Shape Memory in Micro- and Nanometer-scale Pillars. Adv. Mater. Dec. 20, 2007; 20(2):272-8.
Uchino., Materials issues in design and performance of piezoelectric actuators: an overview. Acta Materialia. Jul. 1, 1998;46(11):3745-53.
Ueland et al, Oligocrystalline Shape Memory Alloys. Adv. Funct. Mater. Mar. 1, 2012; 22(10): 2094-2099.
Ueland et al., Grain boundary and triple junction constraints during martensitic transformation in shape memory alloys. J. Appl. Phys. Aug. 1, 2013; 114(5): 0535031-11.
Ueland et al., Superelasticity and fatigue in oligocrystalline shape memory alloy microwires. Acta Materialia. Oct. 29, 2011; 60(1):282-92.
Ueland et al., Transition from many domain to single domain martensite morphology in small scale shape memory alloys. Acta Materialia. Jul. 2, 2013; 61 (15):5618-5625.
Haertling, Ferroelectric ceramics: History and technology. J Am Ceram Soc. Apr. 1999;82(4):797-818.
Jo et al., Giant electric-field-induced strains in lead-free ceramics for actuator applications—status and perspective. J Electroceram. 2012;29:71-93. Epub May 27, 2012.
Kimura et al., Shape-memory effect in PLZT ferroelectric ceramics. *Phase Transitions*. 1981;2(2):113-30. doi: 10.1080/0141159810824134.

* cited by examiner

US 10,364,804 B2

ELECTRIC FIELD ACTIVATION OF SHAPE MEMORY CERAMICS

RELATED APPLICATIONS

This application is a continuation of U.S. patent application Ser. No. 14/670,329, filed Mar. 26, 2015, and entitled "Electric Field Activation of Shape Memory Ceramics," which claims priority under 35 U.S.C. § 119(e) to U.S. Provisional Patent Application Ser. No. 61/970,772, filed Mar. 26, 2014, and entitled "Electric Field Activation of Shape Memory Ceramics," each of which is incorporated herein by reference in its entirety for all purposes. U.S. patent application Ser. No. 14/670,329 is also a continuation-in-part of U.S. patent application Ser. No. 13/791,857, filed Mar. 8, 2013, entitled "Ceramic Structures for Enhanced Shape Memory and Pseudoelastic Effects," which claims priority under 35 U.S.C. § 119(e) to U.S. Provisional Patent Application Ser. No. 61/666,995, filed Jul. 2, 2012, and entitled "Shape Memory and Pseudoelastic Ceramics," each of which is incorporated herein by reference in its entirety for all purposes.

TECHNICAL FIELD

Articles and methods in which an electric field is used to actuate a material, such as a ceramic material, are generally described.

BACKGROUND

Shape memory materials are characterized as those materials that may undergo reversible transformation between two distinct solid phases. The distinct solid phases may be referred to as a martensitic phase and an austenitic phase. Such transformation may in general be induced by exposure to an external stimulus such as, e.g., a change in temperature or applied mechanical stress. In general, shape memory materials dissipate energy during transformation between martensitic and austenitic phases. This energy dissipation is due, in general, to the creation and motion of internal material interfaces during the phase transformations, and the amount of energy that is dissipated is directly related to the transformation stress and strain.

The most widely employed shape memory materials are metals, and in particular metal alloys. Shape memory alloys (SMAs) are well-known for their ability to transform between martensitic and austenitic phases. Preexisting SMA structures are characterized by relatively low transformation stresses and correspondingly low energy dissipation capabilities. Meanwhile, some ceramic materials have been shown to be capable of exhibiting reversible martensitic transformation with high stresses, offering the prospect of improved energy dissipation over that of preexisting SMAs and the ability to particularly address applications in, e.g., actuation, energy harvesting, and mechanical energy damping.

However, in general, because the martensitic transformation and its associated shape change generally leads to substantial internal stresses, ceramics, which are in general brittle materials, have a tendency to crack during such transformation. As a result, ceramics may in general exhibit only very small shape memory strains and commensurately low energy dissipation levels, and tend to fracture or crack during such processes. Thus, although ceramic materials could in principle exhibit shape memory and superelastic properties with useful transformation shape recovery, such properties are not achievable thus far due to the brittle nature of such ceramic materials.

SUMMARY

In view of the foregoing, the present Inventors have recognized and appreciated the advantages of a ceramic shape memory material activated by an electric field. An actuator including the shape memory material may be activated by an electric field.

Accordingly, provided in one embodiment herein is a method, the method including applying an electric field to a ceramic material and transforming the ceramic material from a first solid phase to a second distinct solid phase. The applied electric field is less than a breakdown electric field of the ceramic material, according to certain embodiments.

Provided in another embodiment is an actuator, including a shape memory ceramic, a first conductor and a second conductor. The first and second conductors are configured to apply an electric field to the shape memory ceramic, according to certain embodiments.

Provided in another embodiment is a method of activating an actuator, the method including applying a voltage across a first conductor and a second conductor. The first and second conductors are configured to apply an electric field to a shape memory ceramic, according to some embodiments.

Provided in one embodiment are shape memory materials in general, including ceramic shape memory materials.

Certain embodiments are directed to actuators. In one set of embodiments, the actuator comprises a non-polymeric material capable of achieving a strain of at least 1% when activated by an applied electric field. In some embodiments, the actuator comprises a first conductor and a second conductor, wherein the first and second conductors are configured to apply an electric field to the non-polymeric material.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements). In the drawings.

DETAILED DESCRIPTION

Figure 1:
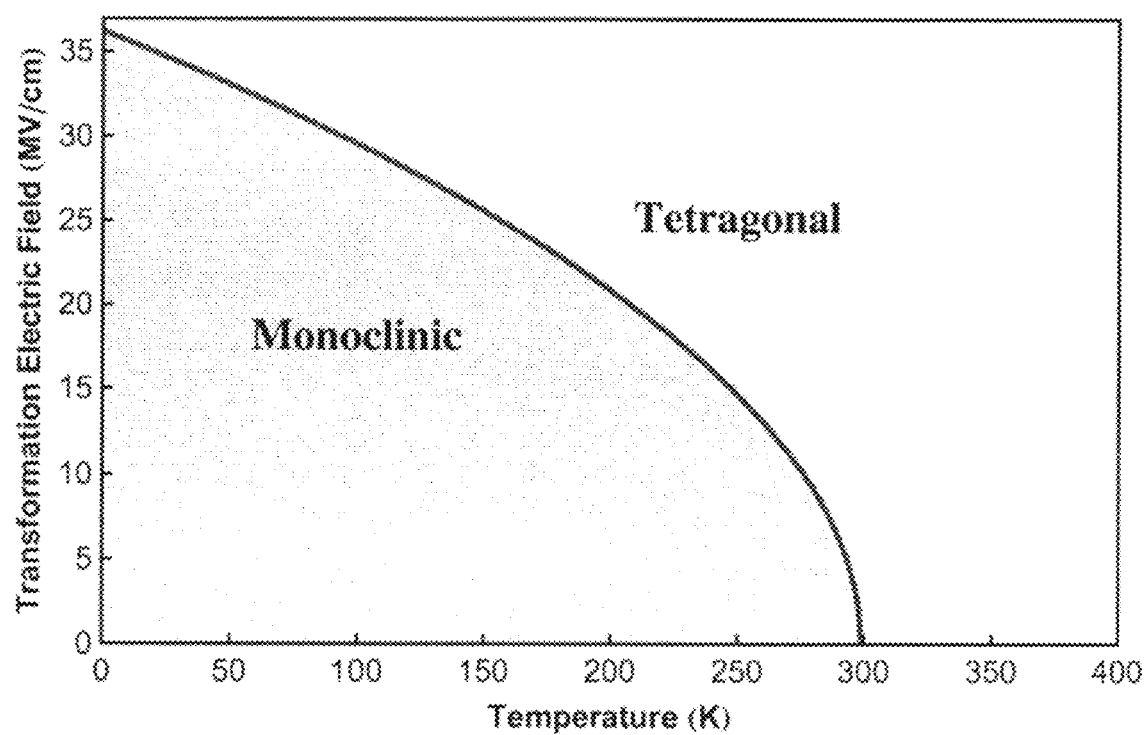
FIG. 1 depicts the theoretical electric field in one embodiment needed for the monoclinic to tetragonal transformation in ceria-doped zirconia as a function of temperature.

Following below are more detailed descriptions of various concepts related to, and embodiments of, inventive methods of activating a ceramic shape memory material by an electric field. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Provided herein, according to certain embodiments, is a method of inducing a solid-state phase transformation in a shape memory ceramic material, the method involving exposure to an electric field. Previously, solid-state phase transformations of shape memory ceramic materials have been produced by applying mechanical stress or thermal excitation. The methods herein may, in some embodiments, induce the solid-state phase transformation in a shape memory ceramic material, the method involving exposure to an electric field, optionally in combination with applied mechanical stresses or thermal excitation. In one embodiment, the method may also vary one of the electric field, mechanical stress, or thermal excitation to induce the transformation, while maintaining the other two at useful levels.

The activation of phase transformations via an electric field in shape memory ceramic materials may be attractive for applications such as, for example, small scale mechanical actuators. Exemplary applications for actuators including shape memory ceramics may include robotics, micro-fluidics, haptics, electronics, nano-positioning, fuel-injectors, ink-injectors, fluid-injectors, colloid injectors, and micro-positioning. Potential applications of shape memory ceramic materials in electronics include camera auto-focus and shutter mechanisms. In some embodiments, actuators including shape memory ceramic materials may be utilized in applications where piezoelectric and magnetostrictive actuators have been employed as their replacement (or together with them). Actuators employing shape memory ceramic materials may produce a greater degree of displacement than piezoelectric actuators. Also, an actuator comprising a shape memory ceramic material overcomes the challenge faced by a shape memory metal alloy actuator in that the latter cannot be directly activated by an electric field.

For a phase transformation from one phase to another (such as from one solid phase to another) to occur, there generally exists a difference in an extensive variable between the two phases. A phase may refer to a homogenous portion of a material that has uniform physical and chemical characteristics, such as a uniform composition and/or crystal structure. If this condition is satisfied then the transformation may be driven by the conjugate intensive variable. In one embodiment, thermodynamically this may be described by the generalized Clausius-Clapeyron relation, which relates any conjugate variable pair to the temperature and the entropy difference between the phases. The relation is derived by setting the free energy of each phase equal, which occurs at the temperature where the two phases are in equilibrium. In its most general form, the relation is written in terms of entropy, but it is more frequently used in terms of the enthalpy of transformation, $\Delta H$, and the equilibrium temperature, $T_{eq}$; both are shown below:

$$\frac{d(\text{Intensive Variable})}{dT} = \frac{\Delta S}{\Delta(\text{Extensive Variable})}, \quad (1)$$

$$\frac{d(\text{Intensive Variable})}{dT} = -\frac{\Delta H_{Trans}}{\Delta(\text{Extensive Variable}) \cdot T_{eq}}. \quad (2)$$

In one embodiment, thermal shape memory alloys are similar to all other temperature induced phase transformations where the extensive variable is the entropy, and each phase has a different total amount of entropy. This allows temperature to be used to drive the transformation.

In one embodiment, in mechanical stress-induced shape memory alloys (superelasticity), the intensive and extensive variables are stress and strain, respectively—the strain carries a volume term which makes it extensive. This yields the stress-temperature Clausius-Clapeyron relationship for shape memory alloys. Stress, $\sigma$, is used to drive a change in strain, $\varepsilon$, and therefore the transformation between the two phases is as shown below:

$$\frac{d\sigma}{dT} = -\frac{\Delta H_{Trans}}{\Delta \varepsilon \cdot T_{eq}}. \quad (3)$$

In one embodiment, in magnetic shape memory alloys the intensive variable is magnetic field, B, and the extensive variable is magnetization, M, leading to the following relationship. The magnetic field is used to drive a change in magnetization between the two phases:

$$\frac{dB}{dT} = -\frac{\Delta H_{Trans}}{\Delta M \cdot T_{eq}}. \quad (4)$$

The Clausius-Clapeyron relation may also be written in terms of electric field (intensive variable) and polarization (extensive variable). The electric field may be used to drive the transformation due to a polarization difference between the phases:

$$\frac{dE}{dT} = -\frac{\Delta H_{Trans}}{\Delta P \cdot T_{eq}}. \quad (5)$$

The relationship shows one important feature that induces a phase transformation with an electric field; the phases should have different polarizabilities. Polarizability may be related to electric susceptibility, $\chi_e$, and eventually to the dielectric constant, $\varepsilon_r$, with the following relationships; note that $\varepsilon_0$ is the permittivity of free space:

$$P = \varepsilon_0 \chi_e E, \quad (6)$$

$$\chi_e = \varepsilon_r - 1, \quad (7)$$

$$\Delta P = \varepsilon_0 \Delta \varepsilon_r E. \quad (8)$$

Not to be bound by any particular theory, but the difference in dielectric constants for electric field induced transformations may explain why transformations in shape memory metals cannot be directly induced by electric fields—the phases in metals do not have differences in polarization. Ceramics, however, may have dielectric differences between phases, and, therefore, phase transformations may be induced with electric fields.

The electric field that may induce a phase transformation may be determined by starting with the general Clausius-Clapeyron equation for electric field and polarizability as conjugate variables:

$$\frac{dE}{dT} = -\frac{\Delta H_{Trans}}{\Delta P \cdot T_{eq}} = -\frac{\Delta H_{Trans}}{\varepsilon_0 \Delta \varepsilon_r E \cdot T_{eq}}.$$

Rearranging the equation:

$$-\frac{\varepsilon_0 \Delta \varepsilon_r T_{eq}}{\Delta H_{Trans}} E \cdot dE = dT.$$

Integrating the left hand side from E=0 to E and the right hand side from $T_{eq}$ to T:

$$-\frac{\varepsilon_0 \Delta \varepsilon_r T_{eq}}{\Delta H_{Trans}} \int_0^E E \cdot dE = \int_{T_{eq}}^T dT.$$

Evaluating the integral:

$$-\frac{\varepsilon_0 \Delta \varepsilon_r T_{eq}}{2\Delta H_{Trans}} E^2 = T - T_{eq}.$$

Rearranging the equation and solving for E:

$$E = \sqrt{\frac{2\Delta H_{Trans}}{\varepsilon_0 \Delta \varepsilon_r}\left(1 - \frac{T}{T_{eq}}\right)}.$$

The resulting relationship shows that the electric field in this embodiment is directly related to the square root of the enthalpy of transformation, which may be thought of as a retarding force. Conversely, the square root of the difference in dielectric constant is inversely related to the required field, and may be considered the driving force for electrical field induced transformation. In some embodiments, the electric field that is applied to the actuators described herein (which may include any of the ceramic materials described herein) is at least:

$$E = \sqrt{\frac{2\Delta H_{Trans}}{\varepsilon_0 \Delta \varepsilon_r}\left(1 - \frac{T}{T_{eq}}\right)}$$

wherein $\Delta H_{Trans}$ is the enthalpy of transformation, $T_{eq}$ is the equilibrium temperature, T is the temperature at the time of the activation, $\varepsilon_0$ is the permittivity of free space and $\Delta \varepsilon_r$ is the change in dielectric constant as a result of the transformation. Specific data for the monoclinic to tetragonal transformation in ceria-doped zirconia may be substituted, and some values are approximate due to chemical composition variations:

$\Delta H_{Mono \to Tet} \approx 5$ KJ/mol,
$\varepsilon_0 = 8.854 \times 10^{-12}$ F/m,
$\varepsilon_{r,Mono} \approx 23$ unitless,
$\varepsilon_{r,Tet} \approx 27$ unitless,
$T_{eq} \approx 298$ K,
$\rho = 5.7$ g/cm$^3$,
M=123 g/mol.

The relationship in one embodiment is depicted graphically in FIG. 1. The area below the curve is the monoclinic phase field, and the area above the curve is the tetragonal phase field. The plot indicates that for this system an electric field may be utilized to drive a transformation from the monoclinic phase into the tetragonal phase, as shown by the shaded region. Not to be bound by any particular theory, but physically this may be because the polarization is directly related to the electric field; an electric field may drive the system to a state of greater polarization, or equivalently, to the state with the higher dielectric constant, which in this case is the tetragonal phase. In some situations, an electric field may be utilized to drive a transformation from a tetragonal phase to a monoclinic phase.

Figure 2:
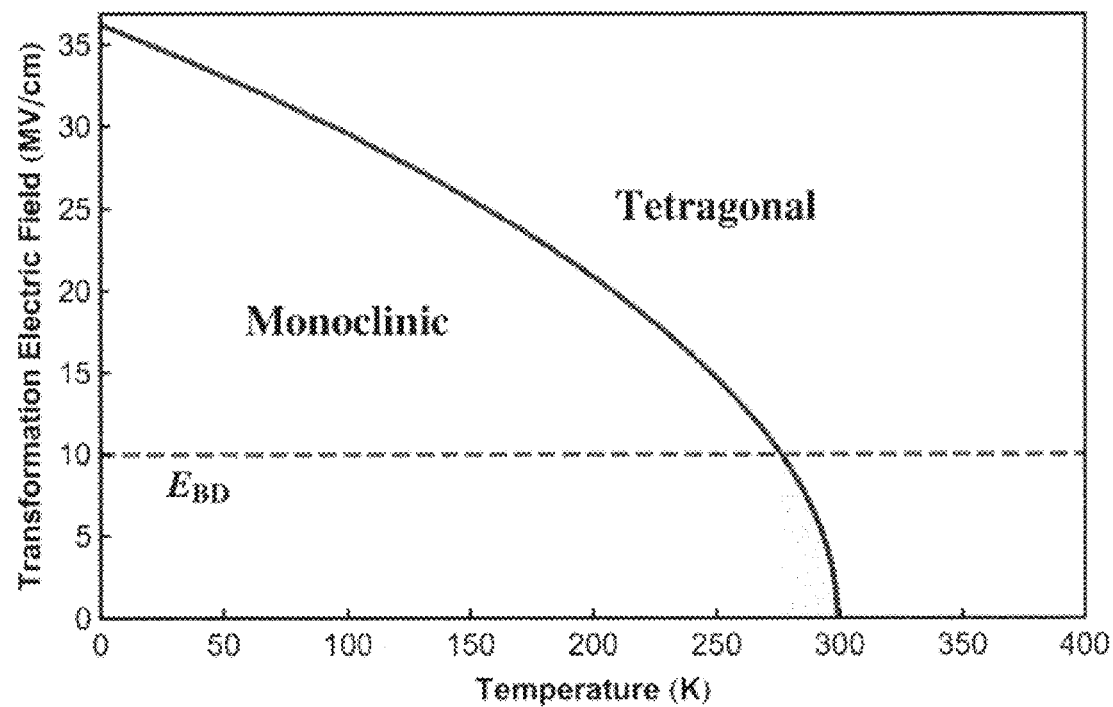
FIG. 2 depicts the theoretical electric field in one embodiment needed for the monoclinic to tetragonal transformation in ceria-doped zirconia as a function of temperature and the breakdown electric field of the ceria-doped zirconia.

The above calculations determine the electric field needed for producing the phase transformation in one embodiment. In general, dielectric materials cannot be exposed to fields of unlimited magnitude; there is generally a limit at which the material will breakdown, known as the breakdown electric field, $E_{BD}$. In order for the phase transformation to be electrically induced, according to certain embodiments, the transformation field should be less than the breakdown electric field. This condition may be met for a specific temperature range for zirconia, for example, where $E_{BD} = \sim 10$ MV/cm, as depicted by the region below the dashed line in FIG. 2. Those of ordinary skill in the art would recognize that the breakdown electric field is an intrinsic property of a particular material, and would be familiar with methods for most accurately determining the breakdown electric field for a given material. The breakdown electric field may be determined, for example, using methods described in ASTM Standard D3755. In one exemplary method, one could apply electrodes to either side of the test sample in an ambient atmosphere at 23° C. and 1 atm of pressure, and apply a voltage across the electrodes that increases at a rate of 500 V/s until an increase in current is detected by a suitable sensing element.

The electric field that produces a phase transformation may be influenced by a variety of additional factors. Factors that may influence the electric field may include the grain size of the ceramic material, internal stresses or strains in the ceramic material, and the size of the ceramic material. Other factors are also possible. For example, in one embodiment, the thickness of a film of the material may influence the electric field that produces a phase transformation. In one embodiment, the electric field that produces a phase transformation may be reduced by these factors. In another embodiment, the electric field that produces a phase transformation may be increased by these factors.

The shape memory ceramic material that may be activated by an electric field may be incorporated into an actuator. The simplest device, according to one set of embodiments, may be similar to a parallel plate capacitor with a layer of active ceramic material sandwiched between two conductive electrodes. The relationship, according to some embodiments, between the electric field (E), applied voltage (V), and thickness of the active ceramic material (t) is given below:

$$E = \frac{V}{t}.$$

Figure 3:
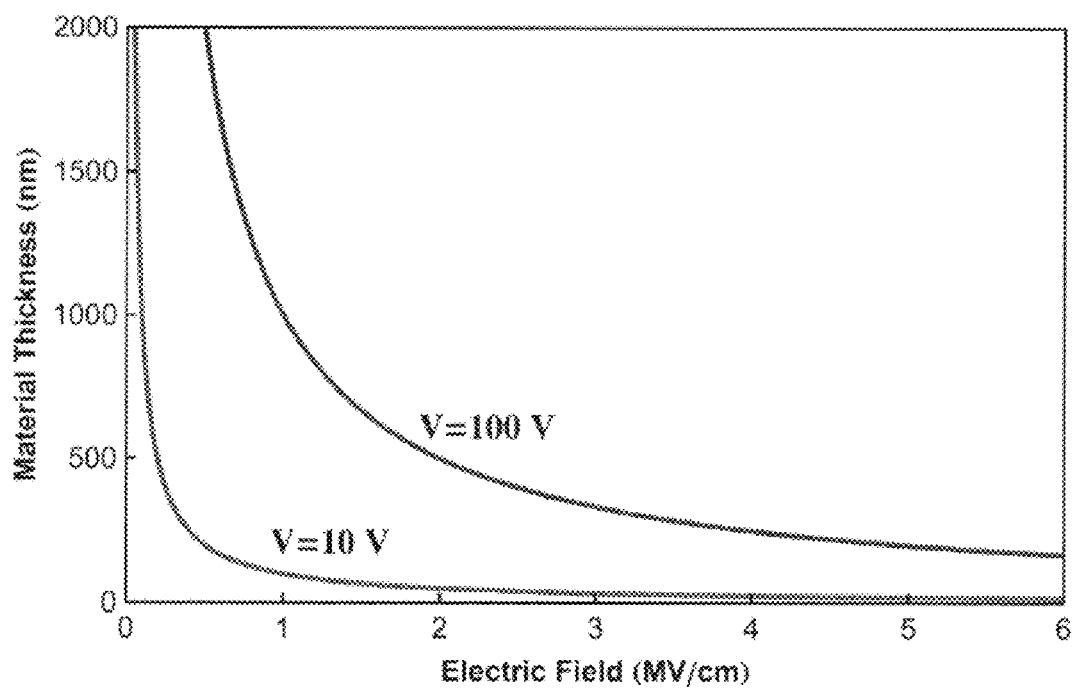
FIG. 3 depicts the thickness of material in one embodiment needed as a function of transformative electric field for two different applied voltages.

This relationship allows the determination, in one set of embodiments, of a thickness of the active ceramic material needed based on the transformation electric field and an applied voltage. FIG. 3 depicts, according to certain embodiments, how the needed material thickness varies with the electric field necessary to induce the transformation for applied voltages of 10 V and 100 V. The inverse trend for each applied voltage curve indicates that for smaller transformation electric fields larger thicknesses may be utilized, for a given temperature. In other words, in this embodiment the larger the applied voltage, the thicker the material may be to still obtain the same electric field within the material.

Figure 4:
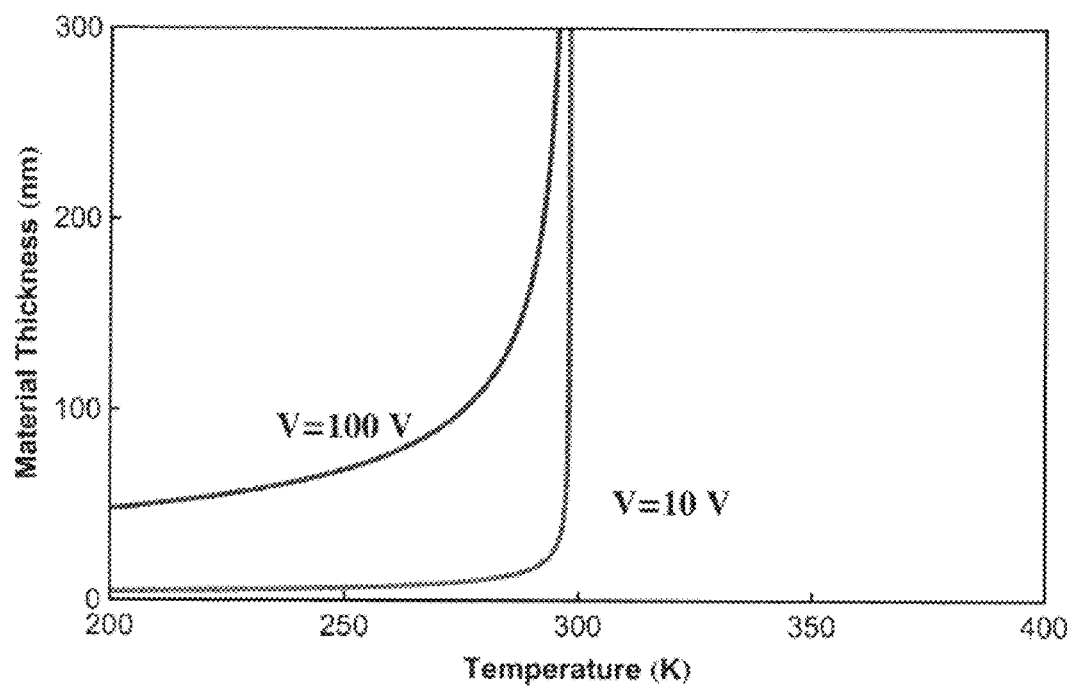
FIG. 4 depicts the thickness of material in one embodiment needed as a function of operating temperature for two different applied voltages.

The dependence of the material thickness on the operating temperature may be determined as shown in FIG. 4. According to certain embodiments, for a given applied voltage, a thinner material (and thus higher resultant electric field) is needed to create a phase transformation. In some embodiments, as the equilibrium temperature is approached, little field is needed to create a phase transformation and greater material thicknesses may be employed. According to one embodiment, the operating temperature may be below the equilibrium temperature. In another embodiment, the operating temperature may be equivalent to or above the equilibrium temperature.

The ceramic materials provided herein, according to certain embodiments, may be included in any ceramic structures that exhibit the shape memory effect, as well as pseudoelasticity, without cracking or fracture, and with a high strain percentage. These characteristics can allow for the application of the ceramic structures provided herein, according to some embodiments, to a wide range of applications that otherwise would not be addressed by preexisting brittle ceramic structures.

The ceramic structures in one embodiment include at least one structural feature that is configured to undergo the shape memory effect or a pseudoelastic effect. Both pseudoelasticity (also referred to herein as superelasticity) and the shape memory effect may be a result of martensitic transformations in the ceramic material structures, according to some embodiments. In one embodiment, martensitic transformations are diffusionless reversible transformations between two different solid phases, characterized by different crystal structures. According to certain embodiments, during the phase transformations, the atoms of the ceramic material move small distances cooperatively, resulting in a phase with a different crystal structure. According to some embodiments, the relative positions of the atoms with respect to each other do not change, i.e., the atoms do not change place with one another. The phase transformation may be additionally associated with a volume or shape change. This shape change, specifically a shape change of the unit cell of the material morphology, is what leads to macroscopic shape changes of one or more structural features according to certain embodiments, as described in detail below.

The ceramic materials provided herein, according to certain embodiments, are capable of exhibiting pseudoelasticity and shape memory phenomenon. In some embodiments, the ceramic materials may reversibly undergo martensitic transformations between a martensitic phase and an austenitic phase over a sequence of transformation cycles. In some embodiments, the ceramic material is capable of undergoing martensitic transformations. The martensitic transformations are, in one embodiment, diffusionless reversible transformations between two different solid phases, characterized by different crystal structures.

In some embodiments, the ceramic material is capable of undergoing martensitic transformations wherein the two phases have a different polarizability as measured by a difference in dielectric constant. In some such embodiments, the difference between the dielectric constants between the two phases can be at least about 0.1, at least about 0.2, at least about 0.3, at least about 0.5, or at least about 1.0 (and/or, in some embodiments, up to about 3.0, up to about 4.0, up to about 5.0, or more).

According to certain embodiments, the ceramic comprises a metal oxide and/or a metalloid oxide. In some embodiments, the ceramic comprises a metal sulfide and/or a metalloid sulfide. In some embodiments, the ceramic comprises a metal nitride and/or a metalloid nitride. The ceramic comprises, according to certain embodiments, a metal silicate and/or a metalloid silicate.

Table I below lists examples of crystalline ceramic materials that may be employed in certain of the ceramic structures provided herein, according to some embodiments.

TABLE I

| Material | Austenite Phase | Martensite Phase | Shear Angle | ΔV/V |
|---|---|---|---|---|
| ZnS | Wurtzite (H) | Sphalerite (3C) | 19.5 | 0.001 |
| $Mg_2SiO_4$ | (a) Olivine | Spinel, γ (Ringwoodite) | 19.9 | −0.085 |
|  | (b) Spinel, γ | β-phase | 40.9 | 0.024 |
| $Mg_2GeO_4$ | Olivine Germanate | Spinel, γ Germanate | 19.5 | −0.087 |
| $MgSiO_3$ | (a) Orthoenstatite | Clinoenstatite | 13.3 | 0.001 |
|  | (b) Protoenstatite | Clinoenstatite | 13.3 | 0.001 |
| $Fe_{0.9}Mg_{0.1}SiO_3$ | Orthoferrosilite | Clinoferrosilite | 13.3 | −0.003 |

TABLE I-continued

| Material | Austenite Phase | Martensite Phase | Shear Angle | ΔV/V |
|---|---|---|---|---|
| CaSiO$_3$ | (a) Parawollastonite | Wallastonite | 13.4 | 0.001 |
| | (b) Parawollastonite | Bustamite | 13.7 | −0.06 |
| Ca$_2$SiO$_4$ | Ortholarnite, α'L | Clinoarnite | 4.5 | −0.035 |
| (Ca$_2$Al$_3$Si$_3$)$_{12}$(OH) | Zoisite | Clinozoisite | 8.8 | 0.038 |
| AlSiO$_5$ | Sillimanite | Kyanite | 26.1 | −0.11 |
| Fe$_2$Al$_4$O$_2$[SiO$_4$]$_2$(OH)$_4$ | Chloritoid monoclinic | Chloritoid triclinic | 7.1 | −0.021 |
| (Al,Mg)$_8$(Al,Si)$_6$O$_{20}$ | Sapphirine monoclinic | Sapphirine triclinic | 21.4 | 0.028 |
| TiO$_2$ | (a) Anatase | TiO$_2$ II | | −0.048 |
| | (b) Rutile | TiO$_2$ II | | −0.019 |
| CaCO$_3$ | Calcite | Aragonite | | 0.06 |
| ZrO$_2$ | Baddeleyite tetragonal | Baddeleyite monoclinic | 8.8 | 0.031 |

Additional example crystalline ceramic materials that may be employed as materials in the ceramic structures provided herein are listed below in Table II.

TABLE II

| Ceramic System | Phase Transformation |
|---|---|
| Mg-PSZ | Tetragonal to Orthorhombic |
| Mg-PSZ | Orthorhombic to Monoclinic |
| Dicalcium Silicate (Ca$_2$SiO$_3$) | Orthorhombic to Monoclinic |
| Dicalcium Silicate (Ca$_2$SiO$_3$) | Monoclinic to Orthorhombic |
| LaNbO$_4$ | Tetragonal to Monoclinic |
| YNbO$_4$ | Tetragonal to Monoclinic |
| Al$_2$O$_9$ | Orthorhombic to Monoclinic |
| Lanthanide Sequioxide (Ln$_2$O$_3$) | Monoclinic to Cubic |
| Enstatites (MgSiO$_3$) | Orthorhombic to Monoclinic |

In the materials described in Table I and Table II above, selected compositions may be produced and dopants may be added as-desired for a given application. For example, a ceramic material, such as ZrO$_2$, may be doped with a selected dopant. The dopant may comprise, according to certain embodiments, cerium, yttrium, hafnium, calcium, ytterbium, europium, titanium and magnesium, or other suitable dopant materials. Combinations of these dopants may also be used, in some embodiments.

According to certain embodiments, in a ceramic structure formed of a ceramic material, such as one of the exemplary ceramic materials in Table I and Table II, there is provided one or more structural features, which, when the ceramic structure is subjected to a suitable stimulus, such as an electric field, may exhibit a reversible martensitic phase transformation, with shape recovery properties, without cracking or sustaining other debilitating mechanical damage. This suppression of cracking during transformation may be achieved, according to certain embodiments, through the imposition of feature dimensions that correspond to the dimensions of martensitic transformation domains in the ceramic structure.

In one embodiment, as a martensitic transformation cycle commences in a ceramic structure, the transformation proceeds in local material regions defined as domains, also known as laths, plates, variants, and platelets. According to certain embodiments, these ceramic domains form as the transformation is initiated, and proceed with a characteristic size that depends directly on a range of factors, including the ceramic material composition and crystallographic orientation, the loading state of the ceramic structure, and the temperature of the ceramic structure during the transformation. In general, martensitic domains in a ceramic material may extend from as small as about 0.01 microns to as large as hundreds of microns—e.g. from about 1 micron to about 100 microns, about 5 microns to about 75 microns, or about 10 microns to about 50 microns. Other size ranges are also possible. Because the domains represent a material that has changed shape and/or volume compared with the surrounding untransformed matrix of ceramic material, the domains may cause significant internal material mismatch stresses. If these stresses become sufficiently high, such stresses may cause cracking of a brittle crystalline ceramic material during the transformation. Similarly, when two or more domains are present in a ceramic material, the domains may compete with one another, causing overlapping stress fields that may cause or exacerbate cracking in a ceramic material during the phase transformation. It is herein recognized that, in some embodiments, domain stress within a transforming crystalline ceramic material is the condition which causes the cracking of preexisting ceramic structures during martensitic transformation.

In one embodiment, free surfaces of ceramic material may relieve the stresses associated with domains that form in a ceramic structure during a martensitic transformation. Therefore, in accordance with certain embodiments, if the domains that form during a martensitic transformation of a ceramic material are relatively near, or in proximity to, or directly adjacent to, a free surface of the ceramic material, the domains in general may produce less internal mismatch stress than if the domains are in the bulk of the material, away from free surfaces. With the internal mismatch stress sufficiently reduced by domain location near a free surface, the ceramic material may then proceed through the martensitic transformation cycle without cracking or fracture, according to some embodiments.

This condition of domain location near, or at, a free surface is achieved, according to some embodiments, in certain of the ceramic structures provided herein by imposing on at least one structural feature of the ceramic structure a size constraint, wherein the feature is no larger, and preferably smaller, in extent than the elongated length of the domains that form in the ceramic structure during a martensitic transformation of the ceramic material of which the ceramic structure is composed. In general, during a martensitic transformation domains form as elongated plate-like structures, with a characteristic elongated phase domain length, herein referring to the length that is associated with the characteristic elongated dimension of the domain structure. In one embodiment, this characteristic elongated phase domain length is a property of the ceramic material composition and transformation conditions, as explained above. In one embodiment, as the plate-like domains grow during a martensitic transformation, the domains do so primarily by thickening; the characteristic elongated phase domain length does not substantially change during the transformation.

In one embodiment, to meet the condition that a structural feature be no larger in extent than the characteristic size of the domains that form in the ceramic structure, there may be imposed the condition that the structural feature be no larger than the characteristic elongated phase domain length of the ceramic material. The characteristic elongated phase domain length may refer to an average caliper length of the elongated dimension, or length, of martensite domains present the ceramic material in bulk form during martensitic transformation. For example, the characteristic elongated phase domain length may be an average elongated domain length measured for a bulk ceramic material that is transformed to a volume fraction of 50% martensite and 50% austenite. This quantitative measurement may be determined experimentally, e.g., by bright field transmission electron microscopy (TEM) conducted on a bulk sample of a ceramic material of interest, to directly image the martensitic domains. With this direct imaging, there may be determined the precise size of martensitic domains for a ceramic material of interest, and a characteristic elongated domain length may be determined from an average of the size of the martensitic domains. A structural feature size less than the characteristic elongated phase domain length may be specified. For many crystalline materials of interest, the characteristic elongated phase length may be determined from scientific literature. For example, it is generally known from scientific literature publications that the characteristic elongated phase domain length of crystalline ceramic $ZrO_2$ is about 5 microns. Depending on the material other characteristic elongated phase domain length values are also possible.

In one embodiment, by meeting the condition that the ceramic structure include a structural feature that is smaller than the characteristic elongated phase length of the ceramic material, the domains that form in the ceramic structure during a martensitic transformation of the ceramic material are near a free surface, e.g., less than about one characteristic elongated phase domain length away from a surface, or are in contact with at least one free surface of the structural feature material. As a result, in some embodiments, the domains do not generally result in cracking of the ceramic structure during a martensitic transformation because the domains do not produce a level of stress that is sufficiently high to induce such cracking. In one embodiment, so long as the characteristic elongated phase length of the martensitic transformation domains of the ceramic material is larger than the structural feature extent, cracking of the ceramic structure during martensitic transformation of the ceramic material is suppressed through a plurality of martensitic transformation cycles, e.g., at least two cycles, at least five cycles, at least ten cycles, or more.

It is discovered that during a martensitic transformation of a ceramic material in the shape memory effect phenomenon or in pseudoelastic loading, there may be produced internal stress concentration in a polycrystalline ceramic material that is related to polycrystalline grain morphology. Specifically, in a polycrystalline ceramic material, each grain may contain atoms that are in a different crystallographic orientation with respect to each other. In one embodiment, given that the grains are randomly oriented within the ceramic material, during a martensitic transformation neighboring grains may change shape in opposing directions, causing internal stress concentrations in the ceramic material. These stress concentrations may lead to intergranular fracture and cracking of the ceramic material.

Many applications may employ a single crystalline ceramic material. With a single crystalline material, grain boundaries are absent, and the physical constraints that are imposed by neighboring grains are removed. As a result, in some embodiments, material phase transformation may occur without stress concentration, thereby minimizing (or eliminating in some instances) intergranular fracture of the ceramic structure. In a single crystalline ceramic structure having a structural feature extent less than the extent of martensitic transformation domains, the ceramic structure may, according to certain embodiments, reliably and repeatedly exhibit martensitic transformation through the shape memory effect or pseudoelastic loading without cracking or other fracture failure.

For a selected crystallinity, structural features that may be controlled with a feature size that is less than the extent of a martensitic transformation domain may take any geometry suitable for a given application. No particular feature orientation or geometry is required, and no particular feature size is required. In some embodiments, at least one structural feature of the ceramic structure is characterized by an extent that is less than the extent of a martensitic transformation domain that forms in the feature during a martensitic transformation of the ceramic material. The ceramic structure may be a pillar or other structure that is supported at only one end, where the characteristic structural features may be the pillar diameter and/or pillar height. The ceramic structure may be a cylindrical structure, such as a wire or fiber, where the characteristic structural feature is the diameter. Cylindrical structures may be arranged in a bundle, cable, braid, or woven sheet. The ceramic structure may be provided in the form of a thin film, plate, coating, layer, membrane, cantilever beam, or double supported beam, where the thickness is the characteristic structural feature. The ceramic structure may be a tubular structure, where the characteristic structural feature is a tube wall thickness. The ceramic structure may be a foam structure including openings in three dimensions that are supported by struts throughout the structure, where the thickness of the struts is the characteristic structural feature.

These exemplary structures demonstrate that a variety of structural features may be controlled to produce an extent that is smaller than martensitic domains forming in the ceramic structure during a martensitic transformation. The extent of the structural feature may be less than or equal to about 100 microns—e.g. less than or equal to about 50 microns, about 25 microns, about 10 microns, about 5 microns, about 1.0 micron, 0.5 microns, 0.1 microns, or smaller. The extent of the structural feature may depend on the geometry and arrangement of the ceramic structure. As one example, in FIG. 5, the structural feature of material 502 can correspond to thickness 512. With these structural feature extents, a martensitic transformation strain level of at least about 1%—e.g. at least about 2%, about 3%, about 4%, about 5%, about 6%, about 7%, about 8%, about 9%, about 10%, about 11%, or more, may be achieved herein. The strain level is in contrast to the much lower strain values that are typically achieved with preexisting ceramic structures. According to one embodiment, the strain may refer to a dimensional change such as elongation of the ceramic structure.

With these structural features, certain of the ceramic structures provided herein may demonstrate superior damping capacity during pseudoelastic cycling. According to certain embodiments, each martensitic transformation in a pseudoelastic cycle dissipates energy in a ceramic structure.

The loss factor, q, that is associated with such energy dissipation, may be expressed as:

$$\eta = \frac{\Delta W}{\pi W_{max}};$$

where $\Delta W$ is the energy dissipated in the ceramic structure per unit volume during one pseudoelastic cycle, and $W_{max}$ is the maximum stored energy per unit volume over the cycle. The energy dissipated during one pseudoelastic cycle, $\Delta W$, is equal to the area within a plot of the pseudoelastic stress-strain curve for the cycle, and the maximum stored energy per unit volume over the cycle, $W_{max}$, is the area under a plot of the pseudoelastic stress-strain curve for the cycle, up to the maximum strain. This energy dissipation loss factor, $\eta$, may be normalized to enable comparison between different materials with an expression for a merit index for stiffness design, to account for the elastic modulus, or Young's modulus, E, of a material, as:

Merit Index=$E^{1/2}\eta$.

In certain of the ceramic structures provided herein, with a structural feature extent smaller than a martensitic domain size that is characteristic of the ceramic, there may be achieved loss factor and merit index values that surpass those of preexisting ceramic structures. For example, a loss factor of at least about 0.13 and a merit index of at least about 1.84 may be achieved for the ceramic structures, and for some ceramic structures, a loss factor of at least about 0.18 and a merit index of at least about 2.5 may be achieved.

Turning now to methods for producing certain of the ceramic structures and structural feature dimensions described herein, no particular production method is required, and any suitable process may be employed, including, e.g., powder processing, sintering, solidification, sol-gel techniques, and any other suitable processes. Melt spinning, inviscid melting, Taylor drawing, and other suitable methods may be employed for wire and wire-like ceramic structures. A ceramic structure geometry and structural feature or features of a selected size or extent may be formed in situ during the production process or may be produced from a bulk ceramic material by a suitable technique, such as machining, micromachining, microfabrication processes, such as ion beam milling, or other techniques.

In one example of such a machining process, first there may be employed a co-precipitation technique that enables control of the ceramic composition from which the ceramic structure is machined. In such a technique, e.g., metal salts of selected elements are mixed and co-precipitated, and then ball milled, dried, and calcined into a powder. The powder may then be pressed into a selected bulk, e.g., a disk, with uniaxial pressure, and then sintered, as in a preexisting process. The sintering time may be controlled to adjust the grain size of the bulk structure, with longer sintering duration producing grain growth.

After sintering of the bulk ceramic material, a ceramic structure may be formed from the bulk material by, e.g., focused ion beam milling or other mechanical process. This can allow for the production of a ceramic structure with high precision and controlled composition. With such ion beam milling, a ceramic structure may be produced from a selected individual ceramic material grain in the bulk material to form a single crystalline ceramic structure, if a single crystalline structure is desired. For example, pillars, cantilever beams, bridges, and other micromechanical structures may be produced as single crystalline ceramic structures by machining such structures from a bulk ceramic material grain.

Alternatively, methods may be employed for producing a single crystalline ceramic bulk material from which a ceramic structure is formed. Any suitable single crystalline formation process may be employed; for example, skull melting, in which induction melting in a skull crucible is conducted with slow cooling to favor growth of large single crystalline regions of ceramic material. Laser floating zone processing of a polycrystalline ceramic material may also be employed to melt locally a bulk ceramic material and/or form single crystalline regions of ceramic material. Any suitable process may be employed where it is desired to form a single crystalline material from which a ceramic structure is to be produced.

In addition, there may be employed processes for forming ceramic structures as a layer or layers, including thin films, free-standing membranes, and other layered structures, and composite structures such as foams. In one exemplary process, there may be employed pulsed-laser deposition conditions for vaporization of ceramic material from a target bulk and subsequent vapor deposition of the vapor species onto a selected substrate or other surface. The resulting vapor-deposited material layer may be polycrystalline, oligocrystalline, or single crystalline, depending on the vaporization and deposition parameters. Other deposition techniques may be employed, e.g., chemical vapor deposition, in which a ceramic material layer is formed on a substrate or other structure by reaction of gaseous precursor species for deposition. Whatever deposition process is employed, layers may be formed on any suitable structure, e.g., a foam structure. Other than vapor-based processing, there may further be employed coating techniques, such as with a slurry of a selected ceramic material, followed by drying and sintering, as in a preexisting process. Slurry casting processes may be employed, such as tape casting, gravity casting or slurry settling, or slip casting, or methods by which a film is formed upon removal of the liquid portion of the slurry, as, for example, in evaporative drawing processes. Slurry processes may be employed to form foam struts having a selected ceramic material composition, extent, and/or geometry.

With these ceramic structure fabrication processes, there may be formed a wide variety of ceramic structures that include structural features meeting the dimensional criteria described above for achieving superior shape memory and pseudoelastic cycling capabilities for actuation, sensing, energy harvesting and conversion, and mechanical damping applications. The combination of high strength, light weight, rapid response characteristic, large recoverable strain, and large energy damping render the ceramic structures provided herein well-suited for many challenging applications.

In general, martensitic transformation cannot be induced in metals with electric or magnetic fields because metals are electrically conducting. Ceramic materials are in general electrically insulating, and therefore the ceramic structures herein may be controlled to undergo martensitic transformation in both the shape memory and pseudoelastic regime with electric and/or magnetic fields. By disposing the ceramic structure in proximity to an electromagnetic field source, martensitic transformation control may be locally implemented. Such electrical control enables increased cycling speed and more precise cycling control with the benefits of large mechanical strain in response to an electrical or magnetic signal.

Figure 5A:
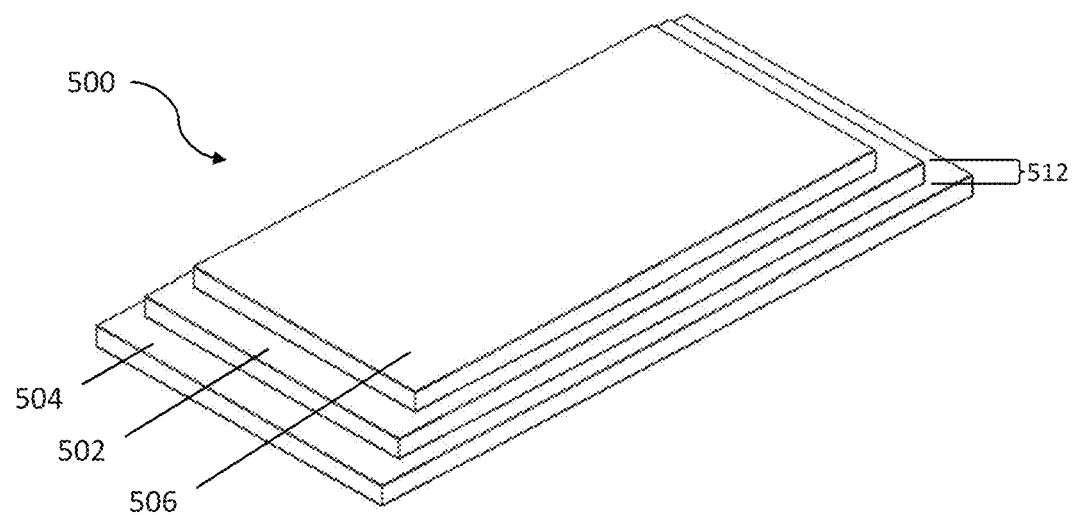
FIG. 5A is a schematic representation of an actuator comprising a shape memory ceramic between two conductive electrodes, according to one set of embodiments.

As noted elsewhere, certain embodiments are related to actuators. In some embodiments, the actuator comprises a material that can be activated by an electric field (also referred to as a material responsive to an electric field). FIG. 5A is a schematic representation of an exemplary actuator 500. In FIG. 5A, actuator 500 includes a material 502 (e.g., a ceramic such as a shape memory ceramic) that can be activated by an electric field. The material that can be activated by an electric field can be any of the materials described herein that are responsive to an applied electric field. In some embodiments, the material that is activated by the electric field comprises a non-polymeric material. In some embodiments, the material that is activated by the electric field comprises an inorganic material. In certain embodiments, the material activated by the electric field comprises a ceramic, such as a shape memory ceramic (including any of the ceramic materials described elsewhere herein). For example, the material can comprise a single crystalline shape memory ceramic or an oligocrystalline shape memory ceramic. In one particular set of embodiments, the material comprises zirconia. In some embodiments, the material comprises at least one dopant selected from cerium, yttrium, hafnium, calcium, ytterbium, europium, titanium, and magnesium.

In certain embodiments, the material that can be activated by an electric field is capable of undergoing a martensitic transformation at a temperature that is greater than 20° C. In some embodiments, the material that can be activated by an electric field is capable of being fully transformed to austenite at a temperature that is greater than 20° C. In certain embodiments, the material that can be activated by an electric field is capable of being fully transformed to martensite at a temperature that is greater than 20° C.

In some embodiments, the actuator comprises a first conductor and a second conductor. The conductor(s) may be in the form of, for example, an electrode(s). All or part of the conductor can be made of any suitable electrically conductive material, including single materials and composite materials. In some embodiments, all or part of the conductor may be made from a metal (e.g., platinum, gold, silver, copper, etc.) and/or a non-metallic conductive material (e.g., heavily doped semiconductors such as silicon). The conductors may be provided on any suitable portion of the material that is activated by an electric field. For example, in some embodiments, one or more conductors may substantially cover a material that is activated by an electric field (e.g., covering at least about 90%, at least about 95%, at least about 98%, or more of an exposed surface of a material that is activated by an electric field). In some embodiments, one or more conductors may cover only a portion (e.g., less than 90% of) of an electric-field activated material, such that one or more portions of the electric-field activated material are exposed.

In certain embodiments, the first and second conductors are configured to apply an electric field to the electric field activated material. One such example is illustrated in FIG. 5A, in which first conductor 504 and second conductor 506 are configured to apply an electric field across material 502. In some embodiments, the first conductor and the second conductor are configured to apply an electric field to the electric-field activated material (e.g., ceramic) in a direction that is substantially parallel (e.g., within 5°, within 4°, within 3°, within 2°, or within 1° of parallel) to the characteristic structural feature of the electric field activated material. For example, in FIG. 5A, the characteristic feature of material 502 is thickness 512, and first conductor 504 and second conductor 506 are configured to apply an electric field in a direction parallel to the thickness 512 of material 502.

In some embodiments, the material that can be activated by the electric field (e.g., a ceramic such as a shape memory ceramic) can be disposed between the first conductor and the second conductor. For example, in FIG. 5A, material 502 is disposed between the first conductor 504 and second conductor 506. In some embodiments, the material that can be activated by the electric field is in contact with the first conductor and/or the second conductor. Two materials that are in contact with each other can have one or more solid intermediate materials positioned between them. In some such embodiments, the material that can be activated by the electric field is in direct contact with the first conductor and/or the second conductor. Materials are said to be in direct contact when at least a portion of the first material directly touches at least a portion of the second material. For example, in the set of embodiments illustrated in FIG. 5A, material 502 is in direct contact with first conductor 504 and second conductor 506. In other embodiments, one or more solid materials may be positioned between material 502 and first conductor 504 and/or between material 502 and second conductor 506. In some embodiments, at least one of the first conductor and the second conductor can be positioned such that the shortest distance between the conductor and the material that is activated by the electric field (e.g., a ceramic such as a shape memory ceramic) is less than about 1 mm, less than about 100 microns, less than about 10 microns, less than about 1 micron, less than about 100 nanometers, or less.

In some embodiments, the material that can be activated by the electric field (e.g., a ceramic such as a shape memory ceramic) can be in the form of a thin film. For example, in FIG. 5A, material 502 can be in the form of a thin film. In some embodiments the material that can be activated by the electric field is in the form of a film with a thickness of less than or equal to about 100 microns.

In some embodiments, one or more conductors of the actuator can be in the form of a thin film. For example, in FIG. 5A, conductor 504 and/or conductor 506 may, in some embodiments, be in the form of a thin film. In some embodiments the first and/or second conductor is in the form of a film with a thickness of less than or equal to about 100 microns, less than or equal to about 10 microns, or less than or equal to about 1 micron.

According to certain embodiments, an electric field can be applied to an electric-field responsive material to operate the actuator. For example, in some embodiments, an electric field can be applied to a ceramic material (or another material that can be activated via the application of an electric field) such that the ceramic material is transformed from a first solid phase to a second distinct solid phase. As one example, the conductors may be connected to a suitable power supply (not shown in FIG. 5A) capable of applying a desired voltage across the conductors, such that an electric field is created.

As noted elsewhere, the applied electric field can be, in some embodiments, less than a breakdown electric field of the ceramic material. In some embodiments, the electric field can be applied using the first conductor and the second conductor. For example, certain embodiments comprise applying a voltage across the first conductor and a second conductor, wherein the first and second conductors are configured to apply an electric field to a ceramic (e.g., a shape memory ceramic). Referring to FIG. 5A, for example, a voltage can be applied across first conductor 504 and second conductor 506, which can result in the application of an electric field to material 502. In some embodiments, application of the voltage produces a mechanical displacement of the actuator. In some embodiments, application of the voltage produces a strain (e.g., a martensitic transformation strain) of at least about 1%, at least about 2%, at least about 3%, at least about 4%, at least about 5%, at least about 6%, at least about 7%, at least about 8%, at least about 9%, at least about 10%, at least about 11% (and/or, in some embodiments, up to about 12%, up to about 15%, up to about 20%, or more). In some embodiments, the strain can be the result of a martensitic transformation of the material that is activated by the electric field (e.g., a ceramic material such as a shape memory ceramic material).

Figure 5B:
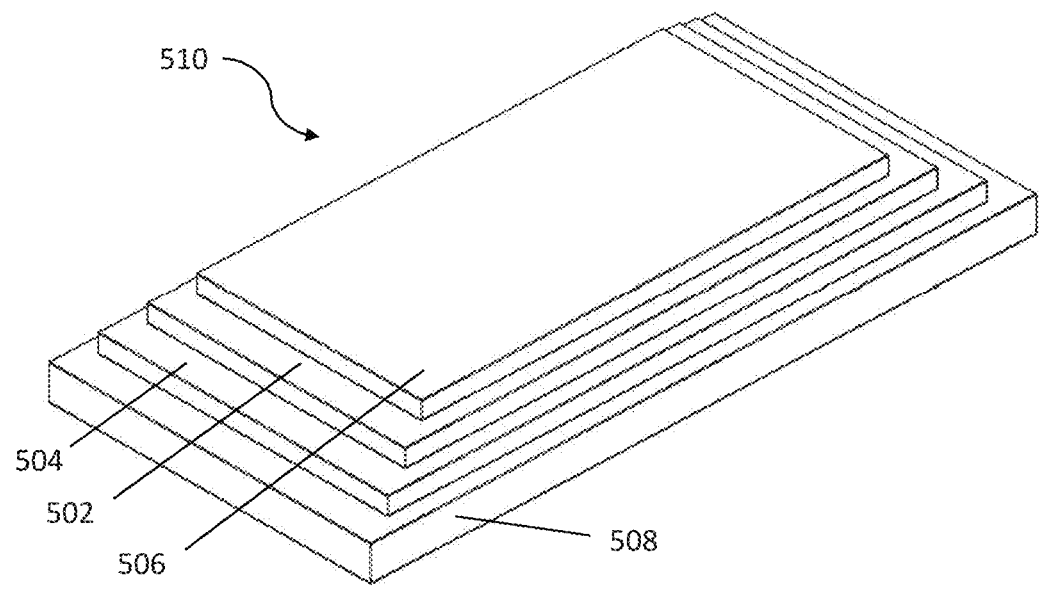
FIG. 5B is, according to certain embodiments, an actuator comprising a shape memory ceramic between two conductive electrodes disposed above a substrate.

While three materials are illustrated in FIG. 5A, additional materials can be present in some embodiments. For example, in some embodiments, the actuator (including, for example, conductor(s) and an electric field activated material) can be disposed on a substrate. For example, FIG. 5B depicts a schematic representation of an actuator 510, comprising substrate 508 on which the conductors 504 and 506, as well as material 502 are disposed.

Figure 6A:
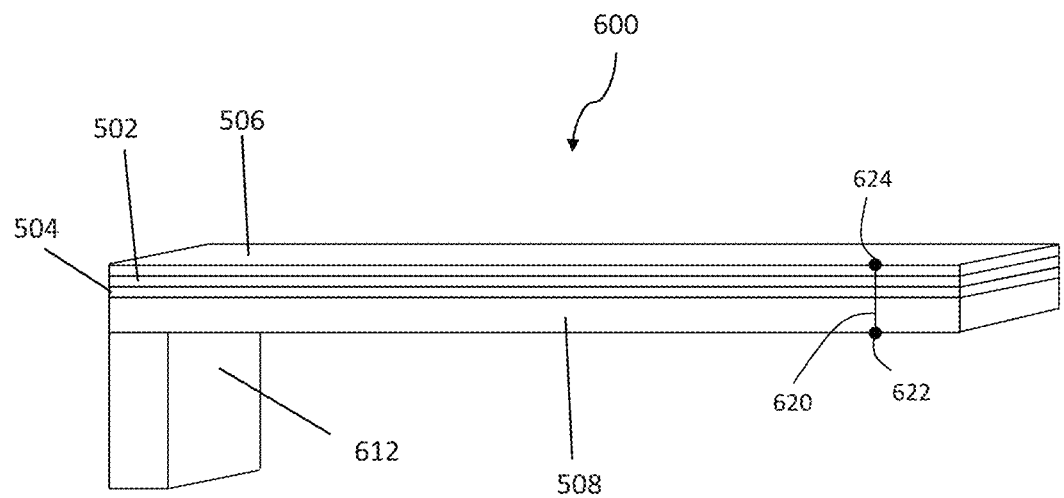
FIGS. 6A and 6B are, according to certain embodiments, schematic representations of a cantilever beam actuator.
Figure 6B:
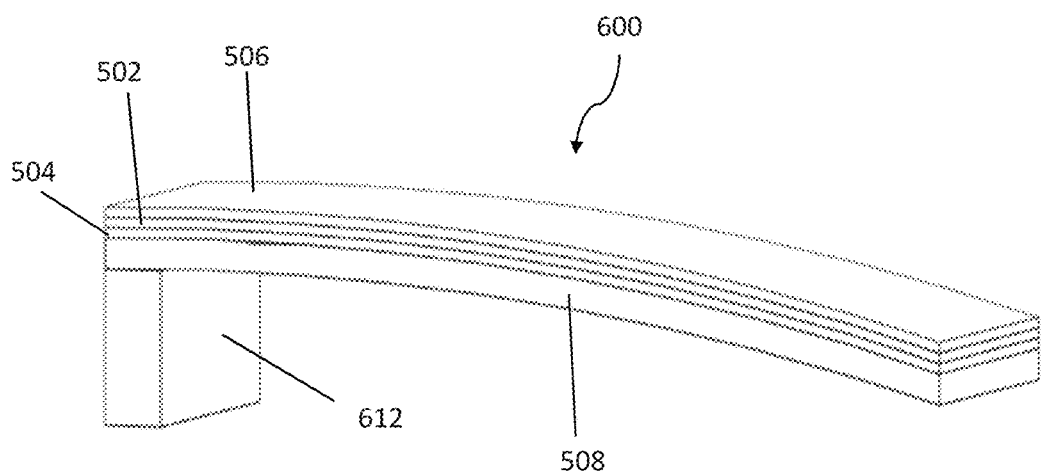

In some embodiments, the actuator is in the shape of an elongated beam supported at one end by a support member. For example, the actuator can be in the form of a cantilever beam. For example, FIGS. 6A and 6B show schematic representations of another embodiment of an actuator 600 formed as a cantilever beam structure. In FIG. 6A, actuator 600 comprises material 502 (e.g., a ceramic material such as a shape memory ceramic material) disposed between conductor 504 and conductor 506. Actuator 600 further comprises optional substrate 508. Actuator 600 is configured as an elongated beam and is supported on one end by support member 612 to form a cantilever beam structure. FIG. 6A shows actuator 600 in an unactuated configuration. In FIG. 6B, an electric field has been applied across conductors 504 and 506 to activate material 502 such that the actuator is strained. While the actuator in FIG. 6B is illustrated as being strained downward, the actuator could also be strained upward, in some embodiments.

Figure 6C:
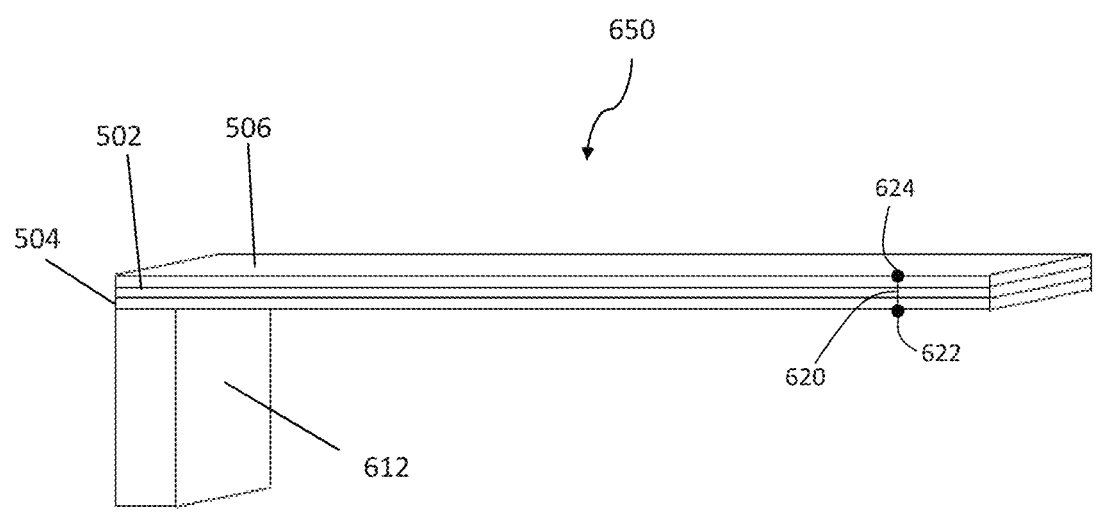
FIG. 6C is, according to some embodiments, a schematic representation of a cantilever beam actuator.

The actuators illustrated in FIGS. 6A and 6B include substrate 508. As described above, however, the substrate is optional, and in other embodiments, the substrate may be absent. For example, FIG. 6C shows an actuator 650 in which material 502, conductor 504, and conductor 506 are present without substrate 508.

Figure 7:
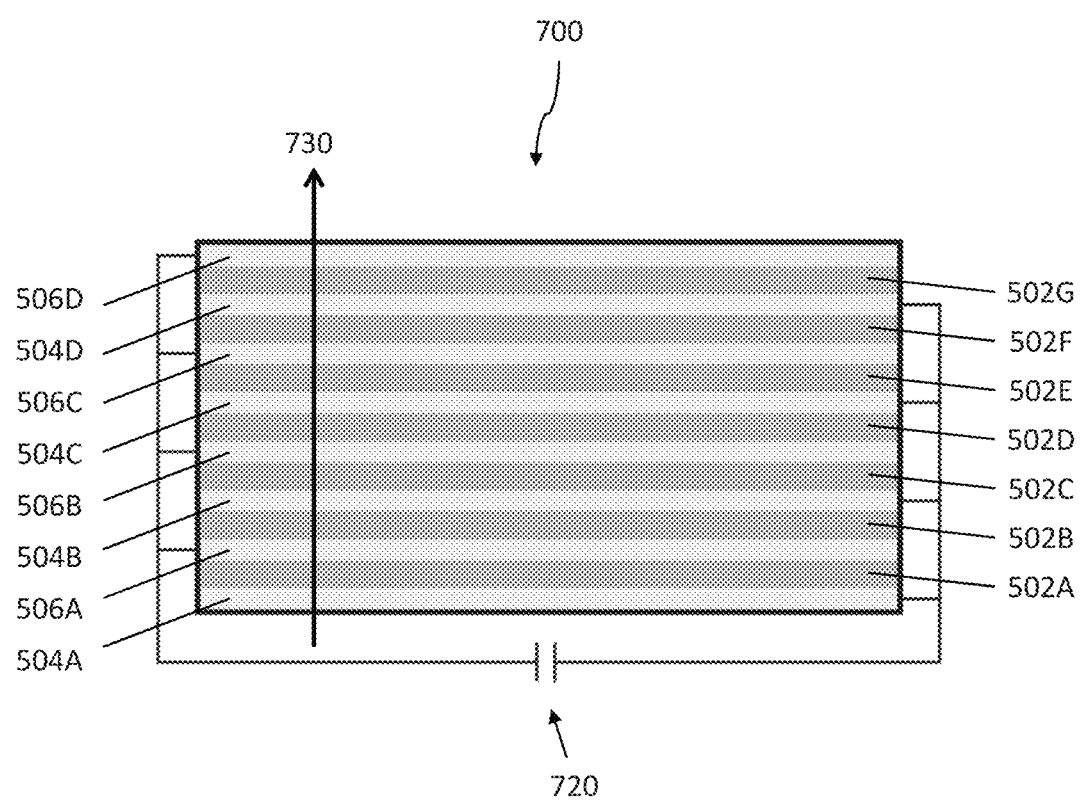
FIG. 7 is a schematic representation of one set of embodiments in which multiple actuators are connected in parallel.

In some embodiments, the actuator may comprise multiple layers of material that are activated by an applied electric field (e.g., a ceramic material such as a shape memory ceramic material). For example, multiple materials that can be activated by an applied electric field can be arranged in a stack, according to certain embodiments. Stacking or otherwise arranging multiple layers in a single actuator may allow, according to certain embodiments, for larger overall displacements, relative to the displacements achievable using actuators having just a single layer of electric field activated material. In one set of embodiments, the actuator comprises at least two (or at least three, at least four, at least five, or more) layers of material that can be activated using an electric field. FIG. 7 depicts a schematic representation of an actuator including seven layers 502A-502G of material 502 (which can correspond to, for example, one or more ceramic materials such as one or more shape memory ceramic materials). In some such embodiments, at least one conductor is present between each of the two (or three, or four, or five, or more) layers of materials that can be activated using an electric field. For example, in FIG. 7, electrode layers 504A-504D and 506A-506D are disposed between layers of material 502. In some embodiments, the conductors can be configured such that, in use, their polarities alternate (between positive and negative) as one traces a path through the thickness of the stack. For example, in FIG. 7, electrode layers 504A-504D and 506A-506D are arranged such that, when connected to power supply 720, the electrode polarity alternates between positive and negative as one traces a pathway along arrow 730. The electrode layers illustrated in FIG. 7 can be arranged electrically in parallel such that the voltage applied across each of the shape memory ceramic layers 502A-502G is substantially constant.

Certain of the electric field activated actuator structures described herein may include components which are substantially transparent to visible light, according to certain embodiments. According to some embodiments, the actuator includes an electric field activated material (e.g., a ceramic material such as a shape memory ceramic material) having a transmittance of at least about 50%, at least about 75%, at least about 85%, at least about 90%, at least about 95%, at least about 98%, or at least about 99% for at least one wavelength of electromagnetic radiation between about 350 nm and about 800 nm (e.g., for at least one wavelength of electromagnetic radiation between about 380 nm and about 800 nm, between about 380 nm and 750 nm, between about 400 nm and 800 nm, between about 400 nm and about 750 nm, between about 400 nm and about 650 nm, or between about 450 nm and about 600 nm). In some embodiments, the actuator includes an electric field activated material having a transmittance of at least about 50% (or at least about 75%, at least about 85%, at least about 90%, at least about 95%, at least about 98%, or at least about 99%) for at least about 50% of the wavelengths (or at least about 75%, at least about 85%, at least about 90%, at least about 95%, at least about 98%, or at least about 99% of the wavelengths) of electromagnetic radiation between about 450 nm and about 600 nm (or between about 400 nm and about 650 nm, between about 400 nm and about 750 nm, between about 400 nm and about 800 nm, between about 380 nm and 750 nm, between about 380 nm and about 800 nm, or between about 350 nm and about 800 nm). Such transparent materials include, for example, single crystalline and/or oligocrystalline ceramic materials and transparent polycrystalline ceramic materials (optionally arranged as a thin film). In some embodiments, $ZrO_2$ (optionally doped with one or more dopants (e.g., ceria) as described above) can be used as a substantially transparent electric field actuated material. Other oxides, silicates, and other materials could also be used as substantially transparent electric field actuated materials.

According to certain embodiments, at least one conductor in an actuator may be substantially transparent to visible light. For example, in some embodiments, at least one of the first and second conductors in an actuator has a transmittance of at least about 50%, at least about 75%, at least about 85%, at least about 90%, at least about 95%, at least about 98%, or at least about 99% for at least one wavelength of electromagnetic radiation between about 350 nm and about 800 nm (e.g., for at least one wavelength of electromagnetic radiation between about 380 nm and about 800 nm, between about 380 nm and 750 nm, between about 400 nm and 800 nm, between about 400 nm and about 750 nm, between about 400 nm and about 650 nm, or between about 450 nm and about 600 nm). In some embodiments, at least one of the first and second conductors in an actuator has a transmittance of at least about 50% (or at least about 75%, at least about 85%, at least about 90%, at least about 95%, at least about 98%, or at least about 99%) for at least about 50% of the wavelengths (or at least about 75%, at least about 85%, at least about 90%, at least about 95%, at least about 98%, or at least about 99% of the wavelengths) of electromagnetic radiation between about 450 nm and about 600 nm (or between about 400 nm and about 650 nm, between about 400 nm and about 750 nm, between about 400 nm and 800 nm, between about 380 nm and 750 nm, between about 380 nm and about 800 nm, or between about 350 nm and about 800 nm). Examples of suitable transparent conductor materials that can be used include, but are not limited to, indium tin oxide (ITO), fluorine doped tin oxide, doped zinc oxide, graphene, transparent conductive polymers, and the like.

In some embodiments, the actuator can be configured to be substantially transparent to visible electromagnetic radiation through its entire thickness. For example, in some embodiments, the actuator has a transmittance of at least about 50%, at least about 75%, at least about 85%, at least about 90%, at least about 95%, at least about 98%, or at least about 99% for at least one wavelength of electromagnetic radiation between about 350 nm and about 800 nm (e.g., for at least one wavelength of electromagnetic radiation between about 380 nm and about 800 nm, between about 380 nm and 750 nm, between about 400 nm and 800 nm, between about 400 nm and about 750 nm, between about 400 nm and about 650 nm, or between about 450 nm and about 600 nm) along at least one pathway that traverses a first outer boundary of the actuator and a second, opposite outer boundary of the actuator. For example, referring to FIG. 6C, in some embodiments, actuator 650 can have a transmittance of at least about 50% (or more, as described above) for at least one wavelength of electromagnetic radiation along pathway 620, which traverses first outer boundary 622 of actuator 650 and second, opposite outer boundary 624 of actuator 650. In some embodiments, the actuator has a transmittance along at least one pathway that traverses a first outer boundary of the actuator and a second, opposite outer boundary of the actuator of at least about 50% (or at least about 75%, at least about 85%, at least about 90%, at least about 95%, at least about 98%, or at least about 99%) for at least about 50% of the wavelengths (or at least about 75%, at least about 85%, at least about 90%, at least about 95%, at least about 98%, or at least about 99% of the wavelengths) of electromagnetic radiation between about 450 nm and about 600 nm (or between about 400 nm and about 650 nm, between about 400 nm and about 750 nm, between about 400 nm and 800 nm, between about 380 nm and 750 nm, between about 380 nm and about 800 nm, or between about 350 nm and about 800 nm).

An actuator comprising an optional substrate can also be configured to be substantially transparent to visible electromagnetic radiation through its entire thickness, according to some embodiments. For example, referring to FIG. 6A, in some embodiments, actuator 600 can have a transmittance of at least about 50% (or more, as described above) for at least one wavelength of electromagnetic radiation along pathway 620, which traverses first outer boundary 622 of actuator 600 and second, opposite outer boundary 624 of actuator 600. In some embodiments, an actuator comprises a substrate and has a transmittance along at least one pathway that traverses a first outer boundary of the actuator and a second, opposite outer boundary of the actuator of at least about 50% (or at least about 75%, at least about 85%, at least about 90%, at least about 95%, at least about 98%, or at least about 99%) for at least about 50% of the wavelengths (or at least about 75%, at least about 85%, at least about 90%, at least about 95%, at least about 98%, or at least about 99% of the wavelengths) of electromagnetic radiation between about 450 nm and about 600 nm (or between about 400 nm and about 650 nm, between about 400 nm and about 750 nm, between about 400 nm and 800 nm, between about 380 nm and 750 nm, between about 380 nm and about 800 nm, or between about 350 nm and about 800 nm).

The ceramic structures described above having a structural feature size that is less than a martensitic transformation domain extent may be formed as oligocrystalline ceramic structures rather than as single crystalline ceramic structures or polycrystalline ceramic structures. An oligocrystalline ceramic structure is herein defined as a structure of polycrystalline ceramic morphology, in which the total surface area of the structure is greater than the total area of the polycrystalline grain boundaries within the ceramic structure. This condition results in the grains of the ceramic structure being coordinated predominantly by unconfined free surfaces rather than by rigid boundaries with other grains within the structure. An oligocrystalline ceramic structure with a structural feature size that is less than a martensitic transformation domain extent is capable of an achievable transformation strain well above that of preexisting ceramic structures, as well as a significant reduction in required stress for stress-induced martensitic transformation. As the extent of the structural feature is reduced below the grain size of the ceramic structure, the achievable transformation strain of the ceramic structure increases as the structural feature extent is further decreased.

In one embodiment, the superelastic characteristics of an oligocrystalline ceramic structure lie between those of a single crystalline ceramic structure and those of a polycrystalline ceramic structure, but may approach those of the single crystalline ceramic structure. For a preexisting polycrystalline ceramic structure, the stress-strain curve for a martensitic transformation exhibits fracture failure of the ceramic structure. For a single crystalline ceramic structure, the stress-strain curve for a martensitic transformation exhibits hysteretic cycling in a forward and reverse transformation with no cracking or failure. For an oligocrystalline ceramic structure, the stress-strain curve for a martensitic transformation exhibits hysteretic cycling in a forward and reverse transformation like the single crystalline ceramic structure, but includes junctures during the transformation in which transformation strain must be accommodated due to grain boundaries and triple junctions. The stress-strain characteristic of the oligocrystalline ceramic structure may far surpass that of a polycrystalline ceramic structure by enabling forward and reverse transformation without cracking, and without requiring single crystalline morphology.

U.S. Patent Publication No. 2014/0005028 by Schuh et al.; published on Jan. 2, 2014; filed as U.S. patent application Ser. No. 13/791,857 on Mar. 8, 2013; and entitled "Ceramic Structures for Enhanced Shape Memory and Pseudoelastic Effects" is incorporated herein by reference in its entirety for all purposes. U.S. Provisional Patent Application Ser. No. 61/970,772, filed Mar. 26, 2014, and entitled "Electric Field Activation of Shape Memory Ceramics" is also incorporated herein by reference in its entirety for all purposes.

Non-Limiting Working Examples

Figure 8:
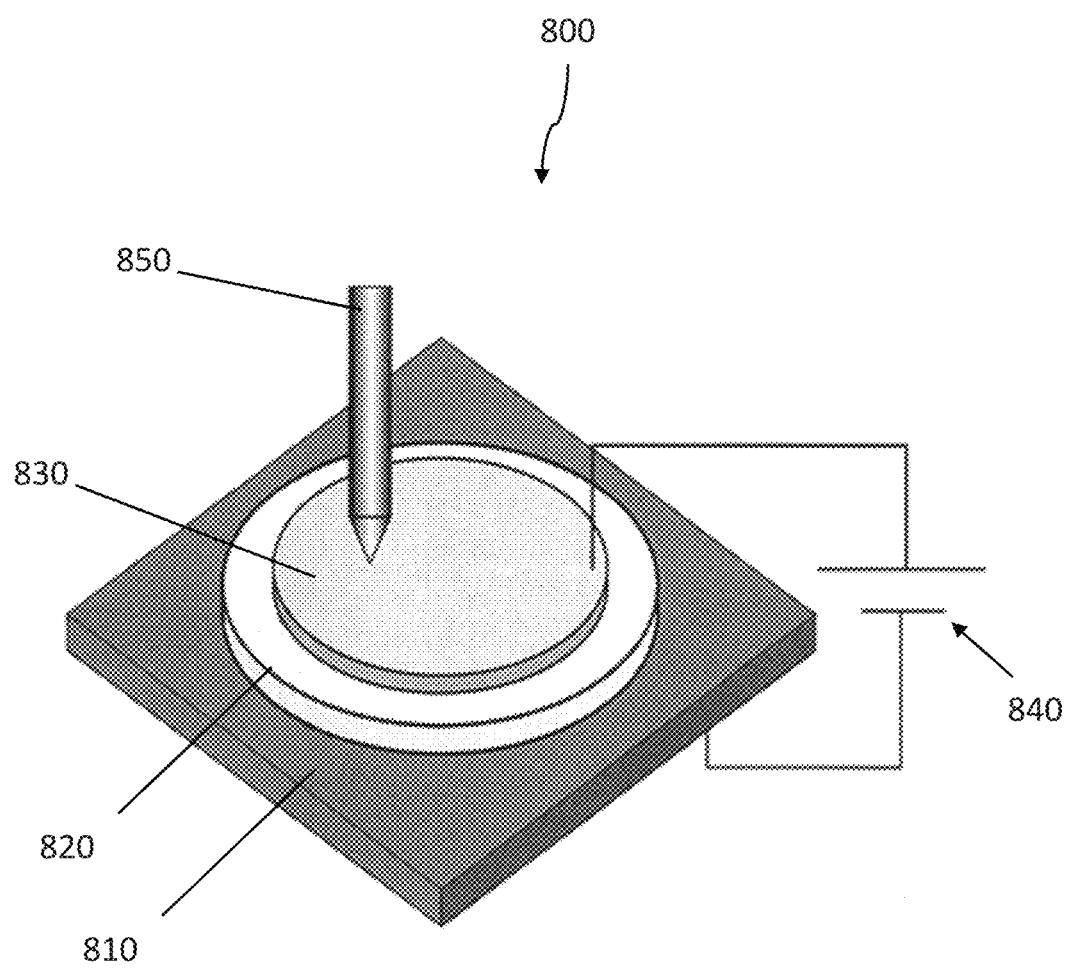
FIG. 8 depicts an experimental setup including a shape memory ceramic between two conductive electrodes in one embodiment.

In one example, thin films of shape memory ceramics ($CeO_2$ doped $ZrO_2$) were prepared using a radio frequency (RF) sputtering technique. The thin films 820 were deposited onto heavily doped conductive silicon wafers 810 in a circular pattern, with a diameter of 11 mm, using a mask. A platinum metal 830 was deposited on top of the ceramic active material in a circular pattern using a smaller mask with 7 mm diameter. The structure produced was a capacitor-like structure where the ceramic film layer was surrounded by two conductive electrodes. Electric leads were applied to the electrodes and then attached to a power supply 840. This whole setup was placed within a nanoindenter with a displacement probe 850 to facilitate measurement of the displacement response due to the application of an electric field to the structure. A schematic of the experimental setup 800 is shown in FIG. 8.

Figure 9:
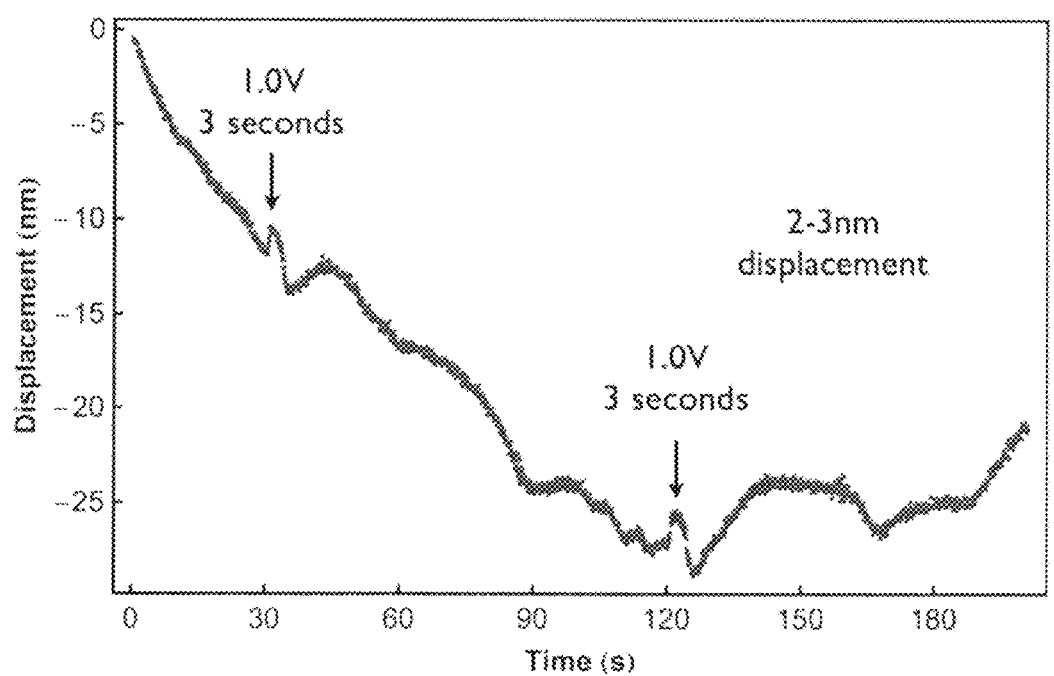
FIG. 9 depicts displacement produced by the experimental setup of FIG. 8 as a function of time in one embodiment.

To measure the displacement produced upon application of an electric field to the ceramic material, the nanoindenter was setup to hold a given load (40 µN) for 3 minutes while measuring the displacement response. At times of 30 seconds and 120 seconds a voltage was applied across the conductors for 3 seconds (a square wave). The results for an 83 nm thick ceria-doped zirconia film are shown in the displacement versus time plot depicted in FIG. 9. Displacements of 2-3 nm (~3% strain) were observed at the times when the voltage was applied. The plot shows an overall variation of displacement over time and that is attributed to the natural drift of the measurement device. Even with the drift, the signal generated when the electric field is active is strong, and the displacement is correlated to the applied voltage.

Figure 10:
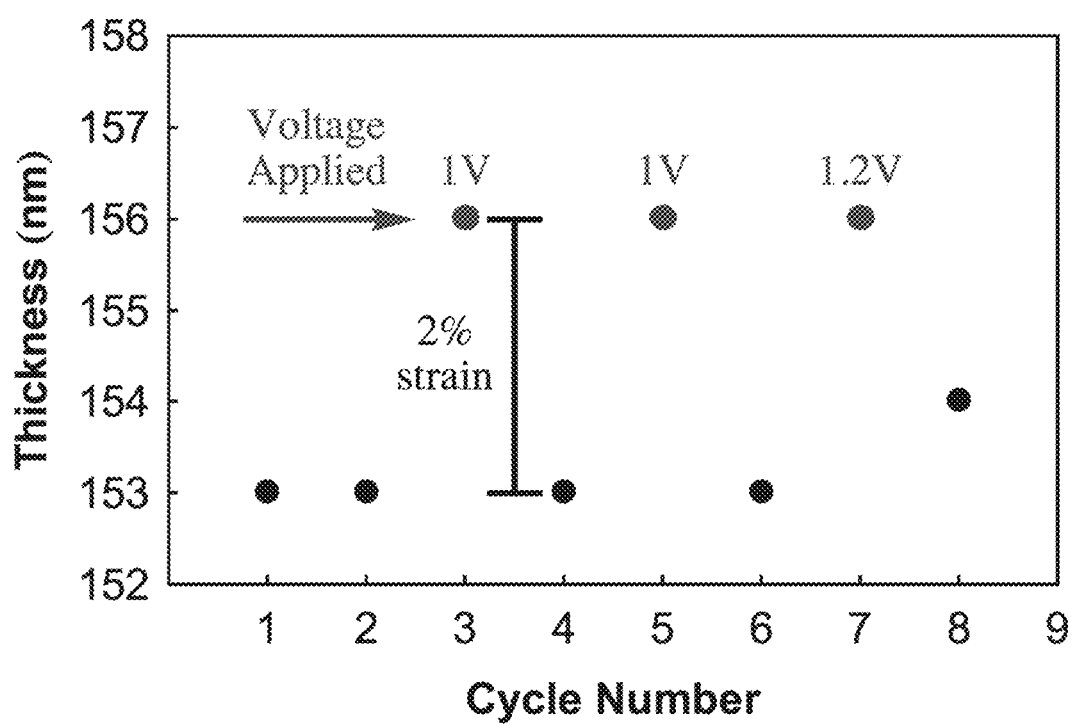
FIG. 10 depicts optical profilometry results showing a thickness change as a function of applied voltage in one embodiment.

Additional testing via optical profilometry was performed on a sample prepared using similar methods to those described above. The thickness of the sample was measured as a voltage was applied across the conductors. The results for an approximately 153 nm thick film are shown in the thickness versus cycle number plot depicted in FIG. 10. Displacements of 2-3 nm were observed corresponding to approximately 2% strain during the cycles when the voltage was applied.

Additional Notes

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein "at %" refers to atomic percent and "wt %" refers to weight percent. However, in certain embodiments when "at %" is utilized the values described may also describe "wt %." For example, if "20 at %" is described in one embodiment, in other embodiments the same description may refer to "20 wt %." As a result, all "at %" values should be understood to also refer to "wt %" in some instances, and all "wt %" values should be understood to refer to "at %" in some instances.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. An actuator comprising:
    a shape memory ceramic capable of exhibiting a reversible martensitic phase transformation;
    a first conductor; and
    a second conductor;
    wherein the first and second conductors are configured to apply an electric field to the shape memory ceramic.

2. The actuator of claim 1, wherein the actuator is capable of undergoing at least two electric field application cycles without cracking.

3. The actuator of claim 1, wherein the shape memory ceramic comprises zirconia.

4. The actuator of claim 1, wherein the shape memory ceramic comprises at least one dopant comprising cerium, yttrium, hafnium, calcium, ytterbium, europium, titanium, and/or magnesium.

5. The actuator of claim 1, wherein the shape memory ceramic is capable of undergoing a martensitic transformation at a temperature that is greater than 20° C.

6. The actuator of claim 1, wherein the shape memory ceramic is capable of producing a martensitic transformation strain of at least about 1%.

7. The actuator of claim 1, wherein the shape memory ceramic is capable of producing a martensitic transformation strain of at least about 3%.

8. A method of activating an actuator comprising:
    applying a voltage across a first conductor and a second conductor, wherein the first and second conductors are configured to apply an electric field to a shape memory ceramic,
    wherein the application of the voltage produces a martensitic transformation of the shape memory ceramic.

9. The method of claim 8, wherein the application of the voltage produces a mechanical displacement of the actuator.

10. The method of claim 8, wherein the application of the voltage produces a strain of at least about 1% in the shape memory ceramic.

11. The method of claim 8, wherein the application of the voltage produces a strain of at least about 3% in the shape memory ceramic.

12. The method of claim 8, wherein the voltage is less than a voltage required to produce an electric field equal to a breakdown electric field of the shape memory ceramic.

13. The method of claim 8, wherein the voltage applied is sufficient to produce an electric field E of at least:

$$E = \sqrt{\frac{2\Delta H_{Trans}}{\varepsilon_0 \Delta \varepsilon_r}\left(1 - \frac{T}{T_{eq}}\right)},$$

wherein $\Delta H_{Trans}$ is the enthalpy of transformation, $T_{eq}$ is the equilibrium temperature, T is the temperature at the time of the activation, $\varepsilon_0$ is the permittivity of free space and $\Delta \varepsilon_r$ is the change in dielectric constant as a result of the transformation.

14. The method of claim 8, wherein a temperature of the shape memory ceramic during the application of the voltage is less than an equilibrium temperature to thermally induce a phase transformation of the shape memory ceramic.

15. The method of claim 8, wherein the shape memory ceramic comprises zirconia.

16. The method of claim 8, wherein the shape memory ceramic comprises at least one dopant comprising cerium, yttrium, hafnium, calcium, ytterbium, europium, titanium, and/or magnesium.

17. An actuator comprising:
    a non-polymeric material capable of achieving a strain of at least 1% when activated by an applied electric field;
    a first conductor; and
    a second conductor;
    wherein the first and second conductors are configured to apply an electric field to the non-polymeric material, and
    wherein the non-polymeric material comprises a shape memory ceramic.

18. The actuator of claim 17, wherein the non-polymeric material is capable of achieving a strain of at least 1% and up to about 20% when activated by an applied electric field.

19. The actuator of claim 17, wherein the non-polymeric material is capable of achieving a strain of at least 1% and up to about 11% when activated by an applied electric field.

20. A method comprising:
    applying an electric field to a ceramic material; and
    transforming, via a diffusionless reversible transformation, the ceramic material from a first solid phase having a first crystal structure to a second distinct solid phase having a second crystal structure that is different from the first crystal structure;

wherein the applied electric field is less than a breakdown electric field of the ceramic material.

21. The method of claim 20, wherein the transforming the ceramic material produces a strain of at least 1% in the ceramic material.

22. The method of claim 20, wherein the transforming the ceramic material produces a strain of at least 1% and up to about 20% in the ceramic material.

23. The method of claim 20, wherein the transforming the ceramic material produces a strain of at least 1% and up to about 11% in the ceramic material.

\* \* \* \* \*